United States Patent [19]
Lee

[11] Patent Number: 5,305,315
[45] Date of Patent: Apr. 19, 1994

[54] TRUNK INTERFACE FOR THE ISDN SYSTEM USING TWO DIFFERENT SIGNALLING SYSTEMS

[75] Inventor: Young D. Lee, Seongnamsi, Rep. of Korea

[73] Assignee: Hyundai Electronics Industries Co., Ltd., Kyoungkido, Rep. of Korea

[21] Appl. No.: 983,777

[22] Filed: Dec. 1, 1992

[30] Foreign Application Priority Data

Dec. 2, 1991 [KR] Rep. of Korea ............... 1991/21998

[51] Int. Cl.⁵ .............................................. H04J 3/12
[52] U.S. Cl. .................................. 370/84; 370/105.1; 370/110.1
[58] Field of Search ................... 370/13, 49.5, 63, 77, 370/84, 100.1, 110.1, 112, 105.1

[56] References Cited

U.S. PATENT DOCUMENTS

| | | | |
|---|---|---|---|
| 5,012,470 | 4/1991 | Shobu et al. | 370/84 |
| 5,034,948 | 6/1991 | Mizutani et al. | 370/110.1 |
| 5,056,086 | 10/1991 | Libonati | 370/63 |
| 5,077,735 | 12/1991 | Myung et al. | 370/110.1 |
| 5,177,738 | 1/1993 | Dell'oro et al. | 370/84 |

*Primary Examiner*—Benedict V. Safourek
*Attorney, Agent, or Firm*—Darby & Darby

[57] ABSTRACT

A trunk interface for an ISDN system which uses two different carriers of CEPT and T1. The trunk interface is for use in an apparatus in order to interface with a central office exchange or the other PABX. The trunk interface includes a DIP switch, a primary rate transceiver and a frame aligner in order to support the CEPT and T1. carriers. The trunk interface communicates with the high order level of the system through a serial port of a D channel controller, so that a microprocessor without a special communication module can be utilized in the trunk interface.

4 Claims, 6 Drawing Sheets

TRUNK INTERFACE FOR THE ISDN SYSTEM USING TWO DIFFERENT SIGNALLING SYSTEMS

BACKGROUND OF THE INVENTION

The present invention relates to a trunk interface for the Integrated Services Digital Network (ISDN) system which uses the North American Standards (which will be referred to as the T1, hereinafter) system together with the Conference of European Post and Telecommunications Administrations (which will be referred to as the CEPT, hereinafter) system and, in particular, to a trunk interface which is equipped to an ISDN Private Automatic Branch Exchange (which will be referred to as the PABX, hereinafter), a Network Termination 12 (which will be referred to as the NT12, hereinafter) or similar apparatus for interfacing with the official exchange which provides ISDN services or the other PABX at the primary rate through trunk lines.

According to recommendations of the CCITT, there are two kinds of systems in the primary rate ; one is CEPT system having the transmission rate of 2.048 Mbps and the other is T1 system having the transmission rate of 1.544 Mbps. In the CEPT system, one multiframe consists of 16 frames of which each frame consists of 32 channels and the channel No.16 of each frame except 0th frame is used a signalling channel and the others are used as B or D channels (30B+1D). On the other hand, in the T1 system, one multiframe may consist of either 12 frames or 24 frames of which each frame consists of 1 framing bit(F) and 24 channel (23B+1D). As the above-mentioned, the two systems are different from each other in aspects of bit rate and frame alignment formation. And clocks offered to the respective system are also different from each other.

For these reasons, a conventional trunk interface for the primary rate is usually constructed in order that it supports only one system of the CEPT or the T1.

Moreover, the most part of he conventional trunk interface separates receiving informations of 30B+1D (CEPT) or 23D+1D (T1) into B channel informations and D channel informations, and it transmits the B channel informations to a switch matrix of the system which has the trunk interface and the D channel information to a high order level of the system which has the trunk interface. Also the conventional trunk interface joins the B channel informations from the switch matrix and the D channel informations from the high order level together, and it transmits the informations of 30B+1D (CEPT) or 23B+1D (T1) to the other exchange.

Accordingly, the conventional trunk interface must utilize a microprocessor which has serial channels such as High Level Data Link Control / Synchronous Data Link Control (HDLC/SDLC) in order to transmit the D channel informations extracted by a D channel controller to the high order level and receive the D channel informations from the high order level, otherwise it must utilize a special communication module which is controlled by microprocessor in order to communicate with the high order level of the system.

Therefore, the trunk interface of the prior art has several problems, that is to say, the selection of the microprocessor is restricted within narrow limits, the cost of production comes high because the trunk interface has to be endued with a microprocessor having the special functions or additionally a special communication module, and the load of the microprocessor is increased because the microprocessor directly take part in the control of D channel communication.

SUMMARY OF THE INVENTION

It is an object of the present invention to provide a trunk interface for the ISDN system using two different signalling systems, wherein the trunk interface has a primary transceiver and a frame aligner which can be applied to the T1 system as well as the CEPT system, also the trunk interface has a D channel controller which communicates D channel informations with the high order level of system having the trunk interface through its serial parts. So, advantages of the invention are that it provides a means of supporting both CEPT system and T1 system for primary rate in accordance with the recommendations of CCITT by simply operating a DIP switch, a microprocessor which is not endued with the special communication module, such as the HDLC/SDLC serial channel, can be utilized to the trunk interface, and it makes the load of its microprocessor decreased.

To achieve the above-mentioned object, the present invention provides a trunk interface which comprises a selection means for adjusting the trunk lines to CEPT system or T1 system; a primary rate transceiving means connected to said selection means, for transmitting and receiving informations in the primary rate of 2.04 BMbps (CEPT) or 1.544 Mbps (T1); a frame alignment means connected to said primary rate transceiving means, for re-forming a frame form of the inputted informations in accordance with the selected signalling system of CEPT or T1; a B channel switching means connected to said frame alignment means, for switching B channel informations of primary rate time slots to PCM time slots in order to transmit the B channel informations of PCM form to a switch matrix, and for switching B channel informations the PCM time slots to the primary rate time slots in order to transmit the informations of primary rate form to the frame alignment means; a D channel control means connected to said frame alignment means, for extracting D channel informations from the inputting informations in order to transmit to a high order level through its serial port, and for inserting D channel informations received from the high order level through its serial port in the frame structures of primary rate; a central processing means respectively connected to said primary late transceiving means, said frame alignment means, said B channel switching means and said D channel control means, for controlling and managing the means connected; a reset means respectively connected to said frame alignment means, said central processing means and said D channel means, for resetting the means connected; and a clock generation means respectively connected to said frame alignment means, said B channel switching means and said D channel control means, for supplying clocks synchronized with a network clock.

BRIEF DESCRIPTION OF THE DRAWINGS

Now, the invention will be described more in detail by means of examples and with reference to the accompanying drawings, in which.

DETAILED DESCRIPTION OF THE PREFERRED EMBODIMENTS

Figure 1:
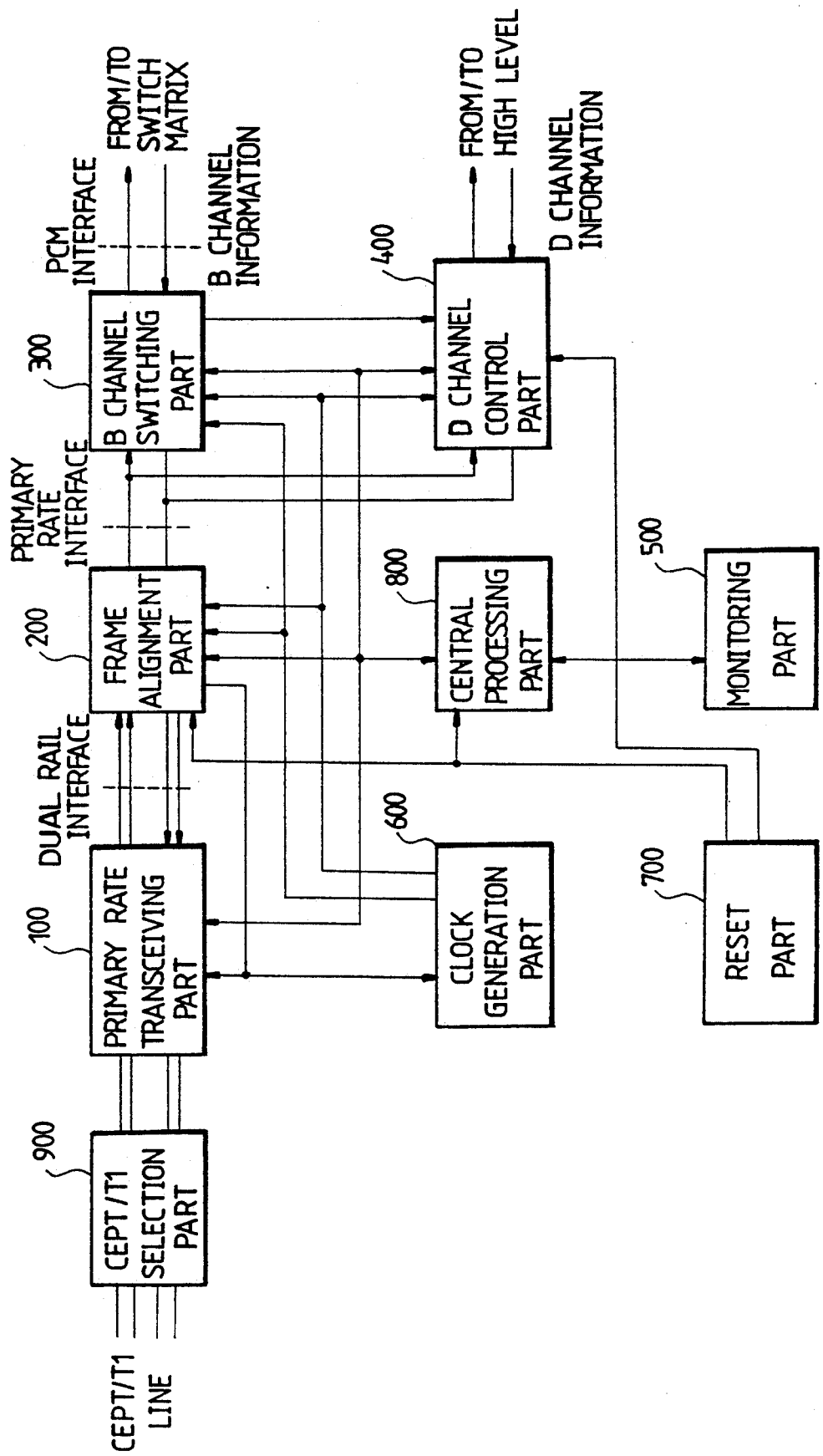
FIG.1 is a block diagram of a trunk interface for the ISDN system using two different signalling systems according to the invention.

Referring to FIG. 1, it shows an embodiment of a trunk interface for the ISDN using the two signalling systems of the CEPT and the T1 according to the invention as a preferred case for the primary rate.

In FIG. 1, reference numeral 100 denotes a primary late transceiving part, 200 a frame alignment part, 300 a B channel switching part, 400 a D channel control part, 500 a monitoring part, 600 clock generation part, 700 a reset part, 800 a central processing part, and 900 a CEPT/TL selection part, respectively.

As shown in FIG.1, the trunk interface of the invention comprises a CEPT/TL selection part 900 connected to the other exchange through trunk lines which can be utilized for the T1 system as well as the CEPT system, a primary rate transceiving part 100 connected to the CEPT/TL selection part 900, a frame alignment part 200 connected to the primary rate transceiving part 100, a B channel switching part 300 connected to the frame alignment part 200 and also connected to a switch matrix (not shown) of the system which has the trunk interface of the invention, a clock generation part 600 respectively connected to the frame alignment part 200, the B channel switching part 300 and the D channel control part 400, a central processing part 800 respectively connected to the primary rate transceiving part 900, the frame alignment part 200, the B channel switching part 300 and the D channel control part 400, a reset part 700 respectively connected to the frame alignment part 200, the D channel control part 400 and the central processing part 800, and a monitoring part 500 connected to the central processing part 800.

The CEPT/T1 selection part 900 performs a function of connecting the trunk lines which are connected to the ISDN official exchange (not shown) or the other ISDN PABX (not shown) to the primary rate transceiving part 100, that is naturally realized by setting the trunk lines to a specified state of CEPT lines or T1 lines according as an operator operates a DIP (Dual In Line) switch to select a signalling system.

The primary rate transceiving part 100 is connected to the CEPT/T1 selection part 900, which transmits and receives the informations at the primary rate of 2.048 Mbps (CEPT) or 1.544 Mbps (T1).

The frame alignment part 200 aligns the input information from the primary rate transceiving part 100 according to the selected system of CEPT or T1 and re-forms the frame form of the selected system of CEPT or T1, that is realized by controlling the informations of the line coding system, frame form, channel allocation signal, CRC (Cyclic Redundancy Check) and alarm, according to the selected system of CEPT or T1.

The B channel switching part 300 performs functions of switching the B channel informations of primary rate time slots to PCM (Pulse Code Modulation) time slots so that the B channel informations of PCM form are transmitted to the switch matrix and it also performs functions of switching B channel informations of the PCM time slots to the primary rate time slots so that the B channel informations of primary rate are transmitted to the frame alignment part 200.

The D channel control part 400 extracts D channel information from the inputting informations of 30B+1D (CEPT) or 23B+1D (T1) and transmits the extracted D channel information to the high order level of the system through its serial port, and it also receives the D channel information from the high level of the system through its serial port and inserts the received D channel informations in the frame structures of the primary rate.

The monitoring part 500 outputs the state informations of the trunk interface to a CRT (Cathode Ray Tube) of PC (Personal Computer) through a RS232 port so that they are displayed on the CRT in detail, and it makes LEDs flicker so that operators recognize an alarm state and the kinds of alarms.

The clock generation part 600 supplies clocks synchronized with a network clock to the whole system. The reset part 700 resets the trunk interface when the power of the trunk interface is turned-on (power on reset) or the operator requests (manual reset). The central processing part 800 performs functions of controlling and managing the trunk interface.

As a matter of convenience, a name of dual rail interface is given to the connection of the primary rate transceiving part 100 and the frame alignment part 200, a name of primary rate interface to the connection of the frame alignment part 200 and the B channel switching part 300, and a name of PCM interface to the connection of the B channel switching part 300 and the switch matrix of the system, respectively.

The notable action of the trunk interface according to the invention may be illustrated as follows.

First, in case that the trunk interface receives informations from the external exchange (Downstream), the primary rate transceiving part 100 receives informations of primary rate of 2.048 Mbps (CEPT) or 1.544 Mbps (T1) through the trunk lines. The received informations are transmitted to the frame alignment part 200. And the informations are re-formed to the frame form of 30B+1D (CEPT) or 23B+1D (T1) in accordance with the selected signalling system of CEPT or T1 are applied to the B channel switching part 300 and the D channel control part 400. Then, the B channel informations of the informations applied from the frame alignment part 200 are allocated to 30 time slots (CEPT) or 23 time slots (T1) of the 32 PCM time slots and they are transmitted to the switch matrix of the system, and the D channel informations of the informations applied from the frame alignment part 200 are extracted by the D channel control part 400 and transmitted to the high level of the system, wherein data informations, such as voice data or image data, are ordinarily carried on the B channels, and signal informations are carried on the D channels.

The states of the above-mentioned action are immediately displayed by the monitoring part 500 on the CRT and the LEDs with the assistance of the central processing part 800, and the clock generation part 600 supplies data clocks of 4.096 MHz or 1.544 MHz and a frame pulse clock of 8 KHz which are essentially requested for operating the trunk interface to the frame alignment part 200, the B channel switching part 300 and the D channel control part 400, respectively.

The reset part 700 respectively resets the central processing part 800, the frame alignment part 200 and the D channel control part 400 when the power is turned-on (power on reset), and, on acting, it too resets the parts 800, 200 and 400 when the reset is requested by the operator (manual reset). The central processing part 800 initializes the primary rate transceiving part 100 and the frame alignment for the signalling system CEPT or T1, it controls the B channel switching part 300 so that the part 300 allocates the B channel informations to the 32 PCM time slots, it also controls the D channel control part 400 so that the part 400 extracts the D channel informations, inserts them, or transmits them, and it let operators know the states of the trunk interface by controlling the monitoring part 500. And the CEPT/T1 selection part 900 alternates the trunk interface into a hardware suitable for the CEPT system or the T1 system according to a state the DIP switch.

On the other land, in case that the trunk interface transmits informations to the external exchange (Upstream), the respective action of the primary late transceiving part 100, the frame alignment part 200, the B channel switching part 300 and the D channel control part 400 is just opposite to the above-mentioned action (Downstream) because the flow of information is the opposite direction. The other actions are like to the above-mentioned actions.

Figure 2A:
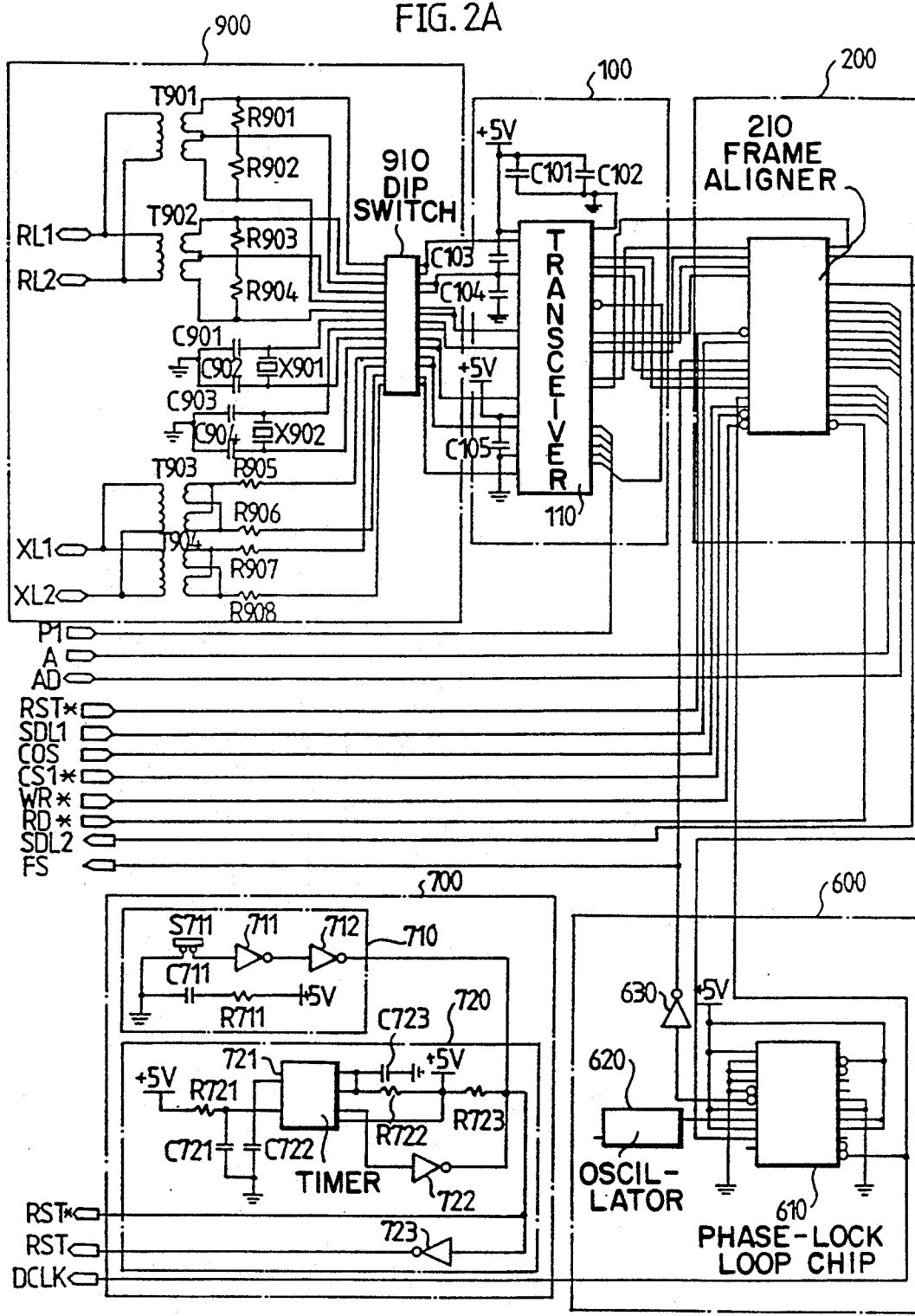
FIG. 2A to FIG. 2C are detailed circuit diagrams of an embodiment of the trunk interface according to the invention.
Figure 2B:
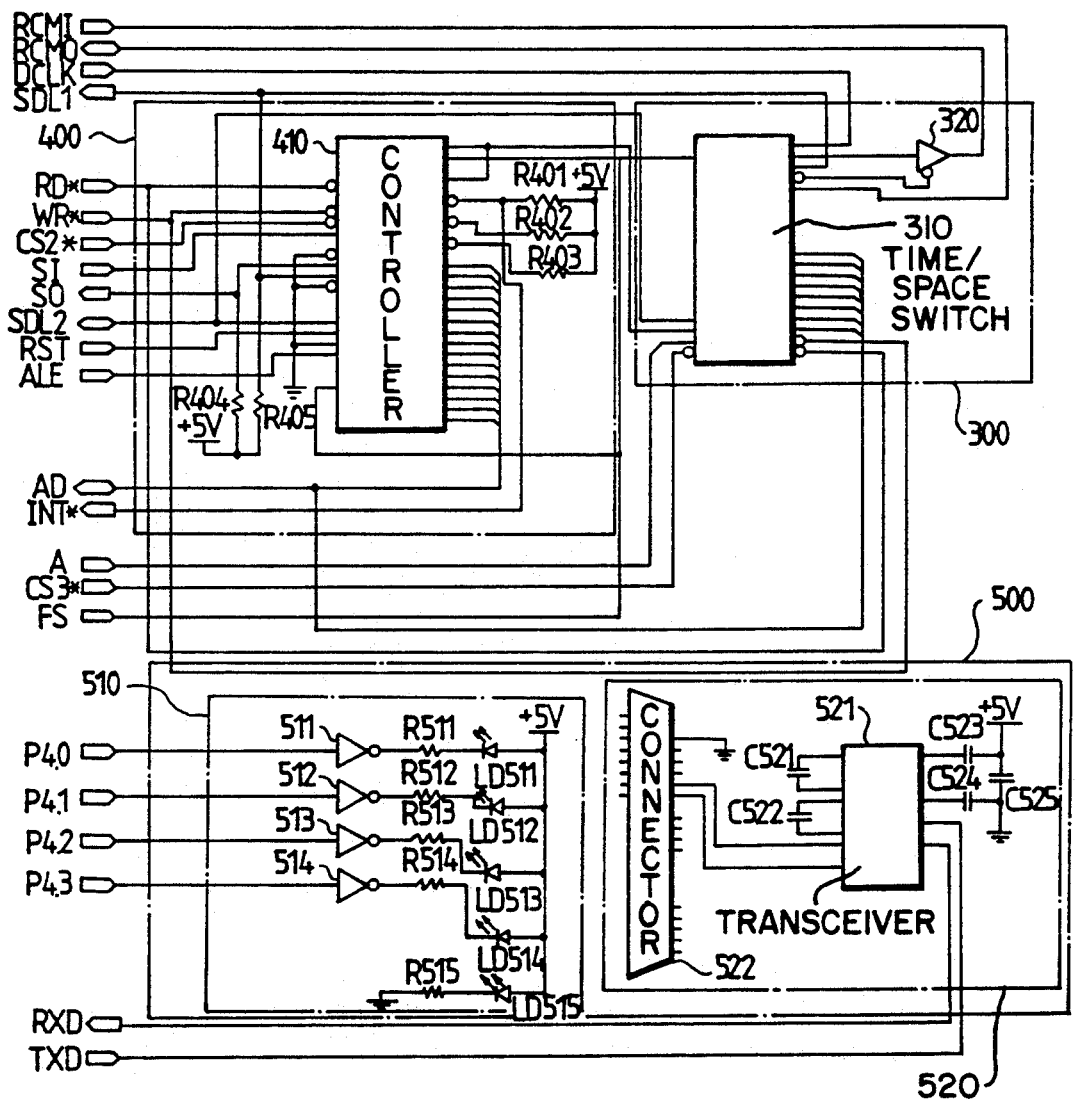
Figure 2C:
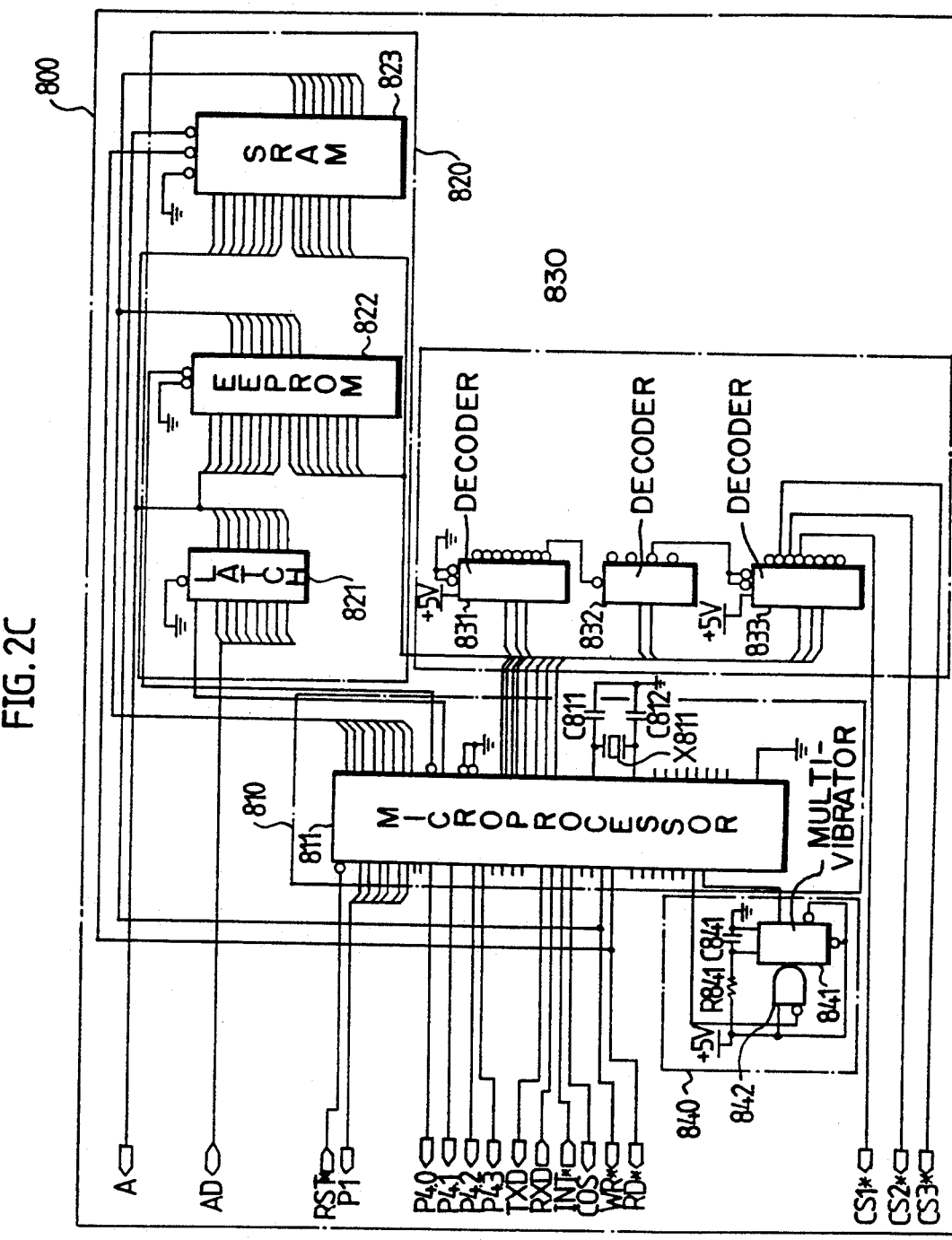

Now, referring to FIG. 2A to FIG. 2C, they are showing detailed circuit diagrams of a preferred embodiment of the primary rate trunk interface.

And, in more detail, the FIG. 2A is a detailed circuit diagram of the CEPT/T1 selection part 900, the primary rate transceiving part 100, the frame alignment part 200, the clock generation part 600 and the reset part 700, the FIG. 2B is a detailed circuit diagram of the B channel switching part 300, the D channel control part 400 and the monitoring part 500, and the FIG. 2C is a detailed circuit diagram of the central processing part 800, respectively.

As shown in the FIG. 2A to 2C, the CEPT/T1 selection part 900 comprises transformers T901 to T904 for connecting the two trunk lines, resistors R901 to R908 and a DIP switch 910 respectively connected to the transformers T901 to T904, and capacitors C901 to C904 and crystal oscillators X901 and X902 respectively connected to the DIP switch 910.

The primary rate transceiving part 100 comprises a primary transceiver 110 connected to the DIP switch 910 and the central processing part 800, and capacitors C101 to C105 connected to the primary transceiver 110.

The frame alignment part 200 is composed of a frame aligner 210 connected to the primary transceiver 110 and the central processing part 800.

The clock generation part 600 comprises a Phase-Lock-Loop (PLL) chip 610 connected to the frame aligner 210, and an oscillator 620 and inverter 630 respectively connected to the PLL chip 610.

The reset part 700 comprises a manual reset circuit 710 which is composed a push button switch S711, inverter 711,712 connected to the push button switch S711, a capacitor C711 and resistor R711 respectively connected to the push button switch S711, and a power on reset circuit 720 which is composed of a timer 721, and inverters 722,723, capacitors C721,C722 and resistors R721 to R723 respectively connected to the timer 721.

The D channel control part 400 comprises a D channel controller 410 connected to the reset part 700, the central processing part 800, the frame aligner 210 and PLL chip 610, respectively, and resistors R401 to 405 connected to the D channel controller 410.

The B channel switching part 300 comprises a time/space switch 310 connected to the central processing part 800, the frame aligner 210, the D channel controller 410 and the PLL chip 610, and a tristate buffer 320 connected to the time/space switch 310.

The monitoring part 500 comprises a LED monitoring circuit 510 which is composed of inverter 511 to 514 connected to the central processing part 800, resistors R511 to R515 connected to the inverters 511 to 514 and LEDs LD511 to LD515 connected to the resistors R511 to R515, and RS232 monitoring circuit 520 which is composed of a RS232 transceiver 521, capacitors C521 to C525 connected to the RS232 transceiver 521 and a RS232 connector 522 connected to the RS232 transceiver 521.

The central processing part 800 comprises a processor circuit 810 which is composed of a general purpose microprocessor 811, a crystal oscillator X811 connected to the microprocessor 811 and capacitors C811,C812 connected to the microprocessor 811, a memory circuit 820 which is composed of a latch 821, a EPROM (Electrically Programmable Read only Memory ) 822, and a SRAM (Static Random Access Memory) 823, respectively connected to the microprocessor 811, a chip selection circuit 830 is composed of decoders 831 to 833 respectively connected to the microprocessor 811, and a watch dog timer circuit 840 which is composed of a multivibrator 841, an AND gate 842 connected to the multivibrator 841, a capacitor C841 connected to the multivibrator 841 and a resistor R841.

Figure 3A:
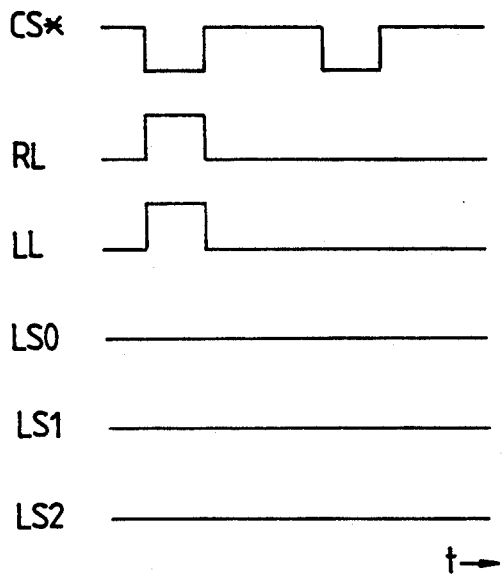
FIG. 3A to FIG. 3C are timing diagrams of a primary rate transceiving part for selecting the CEPT system, the T1 system or a local loop back test.
Figure 3B:
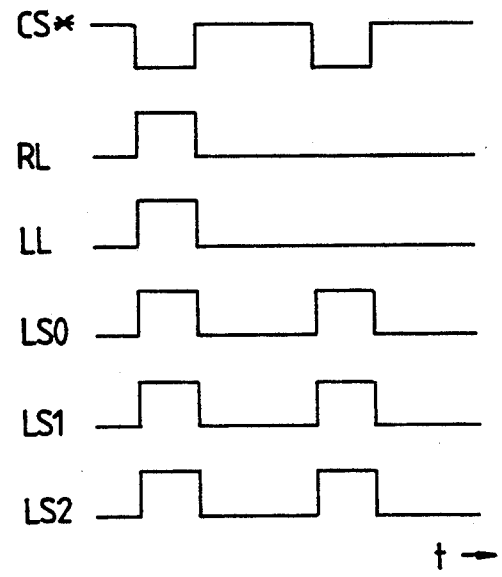
Figure 3C:
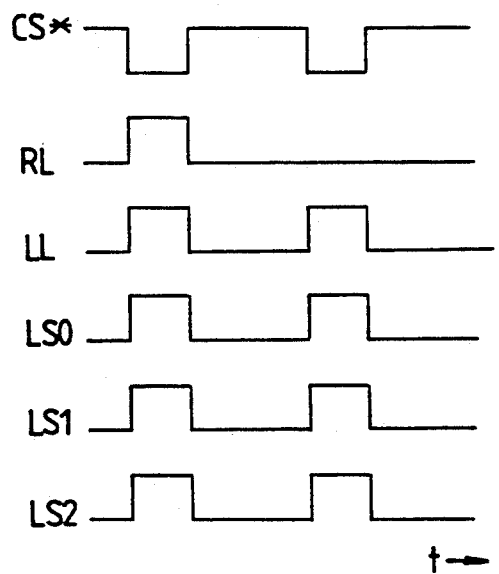

FIG. 3A to FIG. 3C are showing timing diagrams of the primary rate transceiving part 100, in more detail, the FIG. 3A is a timing diagram for selecting the CEPT system, the FIG. 3B is a timing diagram for selection the T1 system, and the FIG. 3C is a timing diagram for selecting the local loop back test, respectively.

Figure 4:
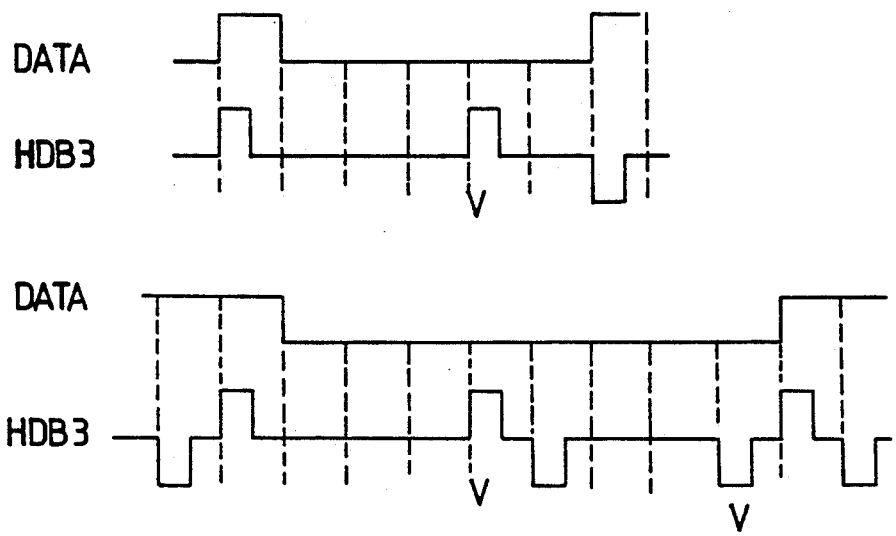
FIG. 4 is a timing diagram of a frame alignment part for a HDB3 line coding.
Figure 5:
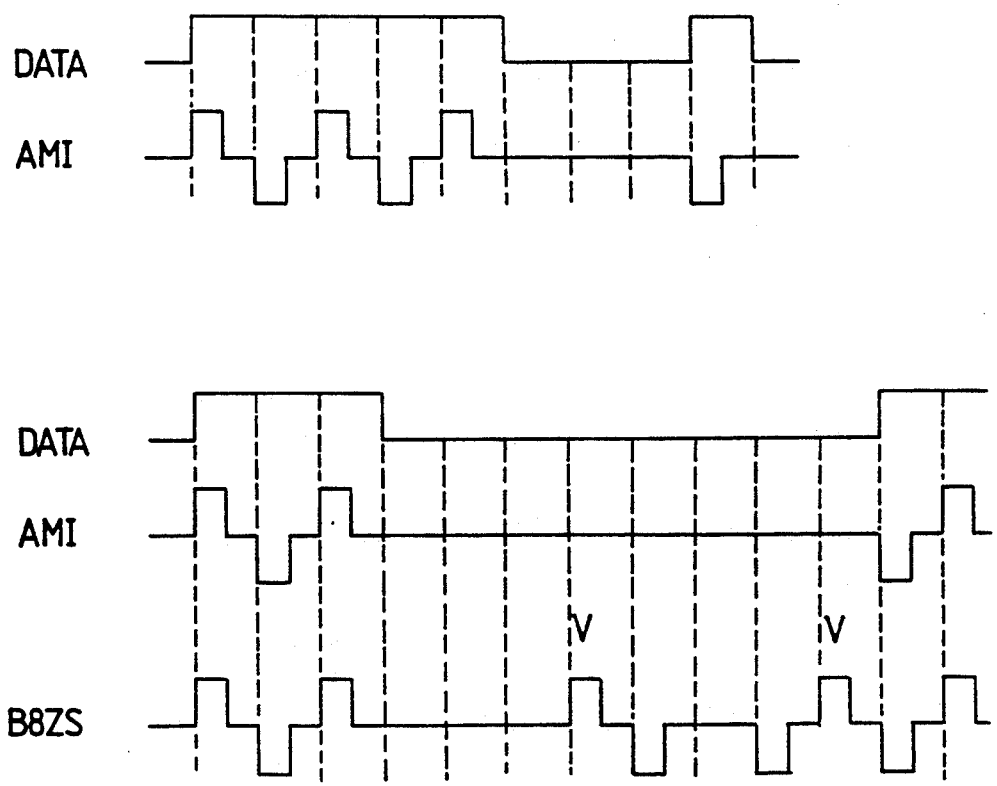
FIG. 5 is a timing diagram of the frame alignment part for AMI and B8ZS line coding.

FIG. 4 is showing timing diagrams of the frame alignment part 200 for the HDB3 (High Density Bipolar 3 Code) line coding, and FIG. 5 is showing timing diagrams of the frame alignment part 200 for the AMI (Alternate Mark Inversion) line coding and the B8ZS (Bipolar 8 Zero Substitution) line according, in the timing diagrams a mark V means violation.

Now, the action of the trunk interface according to the invention may be illustrated in more detail referring to the FIG. 2A to FIG. 5.

First, an operator decides on whether he will use the trunk interface for the CEPT system or not for the T1 system and sets the DIP switch 910 of the CEPT/T1 selection part 900 before it is connected to the ISDN official exchange or the ISDN PABX. If all odd switches of the DIP switch 910 are set off positions and all even switches are set on positions, the trunk interface is alternated into a hardware suitable for the CEPT system, on the other hand if the all odd switches are set on positions and all even switches are set off positions, the trunk interface is alternated into a hardware suitable for the T1 system.

By means of the above operation, a program routine in the EPROM 822 which is programed so that the primary transceiver 110 and the frame aligner 210 suitably act on the CEPT system or T1 system is selected for operating the trunk interface on the selected system. And a layer 1 driver program is stored together with the programs for selecting the CEPT system and T1 system. Therefore, the trunk interface is initialized by the program in EPROM 822 when it as the form of one board is equipped to the ISDN PABX, the NT 12 or similar apparatus.

Through the above mentioned course the signalling system of the trunk interface is decided in CEPT or T1. In case that the trunk interface receives informations from the external exchange (Downstream), the received informations of the CEPT/T1 selecting part 900 are transmitted to the primary late transceiver 110 through the DIP switch 910. A setting of the DIP switch 910 must be performed beforehand for selecting the system of CEPT or T1. Then, the signalling system of the primary transceiver 110 is decided according to inputting signals, as shown in FIG. 3A to FIG. 3C, from a port 1 of the microprocessor (811). Therefore the primary transceiver 110 may be selected for the CEPT or T1 system, furthermore it may be selected for testing the lines and can carry out a local loop back test.

The informations received in the primary transceiver 110 is applied to the frame aligner 210, then the frame aligner 210 performs a line coding of HDB3, as shown in FIG. 4, for CEPT system corresponding to a PCM 30 mode, otherwise preforms a line coding of AMI or B8ZS, as shown in FIG. 5, for the T1 system corresponding to a PCM 24 mode. The frame aligner 210 may take a frame formation of a double frame or CRC multiform for the CEPT system, and it takes a frame formation of multiframe structure for the T1 system. Also, the frame aligner 210 provides channel allocation signals in order to support a CCS (Common Channel Signalling) and a CAS (Channel Associated signalling) for the CEPT or T1 system. And the frame aligner 210 supports to be recognized the information state by checking of the CRC and alarm signals. These selections and controls can be performed by operating registers of the frame aligner 210.

The information processed, as the above-mentioned, are allocated to the primary rate time slots, such as 32 time slots for CEPT system and 24 time slots for T1 system, and they are applied to the time space switch 310. At this time the D channel controller 410 intercepts the D channel informations allocated to a time slot 16 (CEPT) or 9 time slot 24 (T1). And the B channel informations applied to the time/space switch 310 are allocated to the 30 time slots (CEPT) or 23 time slots (T1) of the 32 PCM time slots, they are transmitted to the switch matrix, here, each the inputted B channel information of a primary time slot is loaded on the same number of PCM time slot, for example, a B channel information of the 12th primary rate time slot is loaded on the 12th PCM time slot.

The D channel controller 410 is composed of two functional parts A and B, which each part has the same formation and performs the same function, but the each part acts independently of the other part. The D channel controller 410 extracts D channel informations from the flowing informations and temporally stores the extracted D channel informations in a receiving FIFO (First-in First-out) buffer of its the part B. When the FIFO is fully filled with the D channel informations or at the end of receiving informations, the D channel controller 410 outputs an interrupt signal to the microprocessor, and then the microprocessor reads the D channel information of the FIFO buffer.

And, after the microprocessor temporally stores the D channel informations in a external data memory, it writes the D channel informations in a transmitting FIFO buffer of the part A of the D channel controller 410. At last, the D channel informations are transmitted to the high level through the serial port A of the D channel controller 410.

The clock generation part 600 generates the data clock of 4.096 MHz or 1.544 MHz and the frame pulse clock of 8 KHz by using an input of 8 KHZ synchronized to the network clock from the frame aligner 210 and an input of 16.384 MHz or 12.352MHz from the oscillator 620. The outputting clocks of 4.096 MHz and 1.544 MHz are synchronized to the network clock, also they have a PLL function, because the outputting clocks are returned to inputs of the PLL chip 610 for a feedback and output after comparing with the clock of 8 KHz synchronized to the network and compensating the phase.

The reset part 700 performs of function of the power on reset and the manual reset, wherein an active low signal respectively resets the microprocessor 811 and the frame aligner 210, and an active high signal resets the D channel controller 410. Also, the reset part 700 generates a stabilized reset signal by using the timer 721.

The LED monitoring circuit 510 of the monitoring part 500 displays states of the apparatus through the respective LEDs LD511 to LD515 in accordance with the control of the microprocessor 811. The RS232 monitoring circuit 520 is connected to an asynchronous serial port of the microprocessor 811 through its RS232 transceiver 521, and the circuit 520 can display the detailed states of the trunk interface at the baudrate of 9600 bps or 4800 bps by using the crystal oscillator X811 and the microprocessor 811. The microprocessor circuit 810 of the central processing part 800 controls peripheral circuits and its ports, wherein the port 0 is used for inputting and outputting data and low byte addresses, the port 1 for setting the primary rate transceiving part 100, the port 2 for outputting high byte addresses, the port 3 for inputting the interrupt signal and for monitoring through the RS232 transceiver, the port 4 for monitoring through the LEDS, the port 5 for preparing for a spare, and the port 6 for using the watch dog timer circuit 840, respectively.

The memory circuit 820 is composed of the latch 821, the EPROM 822 and the SRAM 823, in which the EPROM 822 stores the programs for controlling the trunk interface and the SRAM 823 stores the generating data on acting the trunk interface.

The chip selection circuit 830 is composed of three decoders 831 to 833, which selects the frame aligner 210, the time/space switch 310 and the D channel controller 410 by using the high byte addresses. And, the watch dog timer circuit 840 generates a trigger at a given interval of time in normal state, wherein the interval of time is set by a capacitance of the capacitor C841 and a resistance of the resistor R841.

On the other hand, in case that the trunk interface transmits informations to the external exchange (Ustream), the primary late transceiving part 100, the frame alignment part 200, the B channel switching part 300, and the D channelcontrol part 400 act on the contrary toward the above-mentioned downstream.

And, the trunk interface in accordance with this invention is equipped to the ISDN PABX, the NT12 or similar apparatus, and it supports the primary rate transmission of informations for the CEPT or T1 system by interfacing with the ISDN official exchange or the other ISDN PABX, therefore, the trunk interface can always connect to the outside exchange without regard to whether the exchange acts in CEPT system or T1 system.

Accordingly, the effects of the invention are as follows. It provides a means of supporting both the CEPT system and the T1 system of the primary rate in accordance with recommendations of the CCITT by simply operating the DIP switch, and it makes the load of microprocessor decrease. A microprocessor having the special function or a special communication module is not requested essentially, because the trunk interface communicates with the high level through the serial port of D channel controller.

What is claimed is:

1. A trunk interface for a network using two different signalling systems for use in an Integrated Services Digital Network apparatus in order to interface with a central office exchange or other Private Automatic Branch Exchange through trunk lines, comprising:
   a selection means for adjusting the trunk interface to a CEPT system or a T1 system;
   a primary rate transceiving means connected to said selection means, for transmitting and receiving information at a primary rate of 2.048 Mbps (CEPT) for 1.544 Mbps (T1) in a primary rate format;
   a frame alignment means connected to said primary rate transceiving means, for re-formatting a frame of transmitted or received information in accordance with the selected signalling system of CEPT or T1;
   a B channel switching means connected to said frame alignment means, for switching B channel information in primary rate time slots to PCM time slot in order to transmit the B channel information in PCM format to a switch matrix, and for switching B channel information in PCM time slots to primary rate time slots in order to transmit the B channel information to the frame alignment means;
   a D channel control means connected to said frame alignment means, for extracting D channel information from received information in and for inserting D channel information received from the high order level order to transmit said D channel information to a high order level, into transmitted information in the primary rate format;
   a central processing means respectively connected to said primary rate transceiving means, said frame alignment means, said B channel switching means and said D channel control means, for controlling and managing said primary rate transceiving means, said frame alignment means, said B channel switching means and said D channel control means;
   a reset means respectively connected to said frame alignment means, said central processing means and said D channel control means, for resetting said frame alignment means, said control processing means and said D channel control means; and
   a clock generation means respectively connected to said frame alignment means, said B channel switching means and said D channel control means, for supplying clocks synchronized with a network clock.

2. A trunk interface according to claim 1, further comprising a monitoring means connected to said central processing means, for outputting state information through a RS232 port in order to display said state information on a CRT, and for controlling LEDs in order to signify an alarm state.

3. A trunk interface according to claim 1, wherein said selection means comprises:
   a DIP switch for setting the signalling system for CEPT or T1.

4. A trunk interface according to claim 1, wherein said D channel control means comprises:
   a first part for communicating said received and transmitted information with said frame alignment means through a serial port;
   a second part for communicating with the high order level through said serial port; and
   each of the first and second parts has the same structure, and acts independently of the other part.

* * * * *